United States Patent [19]

Raff

[11] 4,060,790
[45] Nov. 29, 1977

[54] METHOD OF DETECTING THE PRESENCE OF AN ENEMY SUBMARINE

[75] Inventor: Samuel J. Raff, Chevy Chase, Md.

[73] Assignee: The United States of America as represented by the Secretary of the Navy, Washington, D.C.

[21] Appl. No.: 334,666

[22] Filed: Dec. 30, 1963

[51] Int. Cl.$^2$ ............................................... G01S 9/66
[52] U.S. Cl. ................................................... 340/3 R
[58] Field of Search .................... 340/2, 3, 5, 6, 3 R

[56] References Cited

U.S. PATENT DOCUMENTS

| | | | |
|---|---|---|---|
| 2,418,846 | 4/1947 | Meacham | 340/3 |
| 2,760,180 | 8/1956 | Sipkin | 340/6 |

*Primary Examiner*—Richard A. Farley

EXEMPLARY CLAIM

1. The method of detecting the presence of an enemy submarine within a given body of water without revealing the position of a listening vessel outside said body of water to said enemy submarine which comprises the steps of:

submerging a self-contained sound source on the floor of the ocean on the central vertical axis of said body of water, said sound source having a sufficient power output to enable sound waves to be transmitted to an enemy submarine within said body of water and be reflected therefrom to points outside said body of water, propagating a high intensity, nondirectional sound signal from said sound source within said body of water, positioning a listening vessel a predetermined distance outside said body of water, said predetermined distance being that required for said listening vessel to detect an echo of a sound signal originating at said sound source and reflected from said enemy submarine, while the sound from the source reflected from said listening vessel into said body of water will be of too low a level to be detected at said enemy submarine within said body of water and detecting an echo of a sound signal originating at said sound source and reflected from said enemy submarine at said listening vessel.

6 Claims, 3 Drawing Figures

INVENTOR.
Samuel J. Raff
BY Thomas O. Watson Jr.
ATTORNEY

METHOD OF DETECTING THE PRESENCE OF AN ENEMY SUBMARINE

The invention described herein may be manufactured and used by or for the Government of the United States of America for governmental purposes without the payment of any royalties thereon or therefor.

The present invention relates generally to sonar detection systems and more particularly is directed to a method for detecting the presence of a quiet enemy submarine without revealing the position of a listening vessel upon which a detecting means is located. In present sonar systems employed for active underwater detection and ranging purposes, a transducer located at the listening vessel emits the ping or pulse of sound and later receives an echo reflected from a distant object. The time interval between signal transmission and echo reception is used to determine the distance between the distant object and the transmitter.

A major disadvantage of active sonar systems presently in use is that the position revealed by the sound transmission is that of the listening vessel, and such sonar systems more readily lend themselves to detection by enemy vessels than would be the case where the sound transducer was separated from the listening vessel.

The present invention overcomes the above disadvantage by providing a method of detecting a signal reflected from an enemy submarine which employs a plurality of submerged sound sources separated from the listening vessel and adapted to transmit a signal to an enemy submarine, the echo of which may be received at the listening vessel. By allowing the listening vessel to assume a position a predetermined distance from the submerged sound source and a predetermined distance from a body of water to be monitored by the listening vessel, the echo reflected from the target to the listening vessel may be detected without causing the listening vessel to reflect any detectable signals from the submerged sound source to a target submarine within the above body of water.

Recent advances in reactor technology indicate that a self-contained, reactor powered sound source can be used in the present invention. The sound source or sources may be deposited on the floor of the ocean and will, for long periods of time, generate sounds having proper characteristics to give detectable echos from enemy submarines in the area. Such devices would permit active sonar detection with only a small risk or revealing the position of the listening vessel. Barricades may be set up in certain ocean areas by employing a plurality of the sound sources in a line and backing them up with a plurality of friendly picket submarines.

An important feature of the system is that no attempt is made to disguise the sound sources which will, of necessity, be nondirectional. The defending submarine (listening vessel) stands in a region which is not strongly insonified because of the distance from the defending submarine to the sound source and the propagation characteristics, i.e., pressure and thermal gradients of the water. The knowledge of the presence of the sound source is of no use to the enemy because they cannot bypass the barrier and because the sound sources themselves, lying on the ocean floor, will be extremely difficult to destroy.

An object of the present invention is to provide a method of detecting the presence of a target submarine without revealing the position of the listening vessel.

Another object is to provide a method of detecting echo signals reflected by a target submarine, said echo signals being adapted for process with known correlation techniques to provide fire control quality information on the position of an enemy submarine at a listening vessel or coastal station.

A further object of the invention is to make use of the refraction phenomena of the propagation of sonar in deep water to enable an ocean bottom mounted sound source to highly illuminate an enemy submarine within a given body of water while poorly illuminating a listening vessel in regions adjacent thereto.

Yet another object of the invention is to provide a method of detecting the presence of an enemy submarine by employing submerged sound sources, the maximum range direct sound path of which will encompass and illuminate an enemy submarine and enable signal echoes therefrom to be detected at the listening vessel.

Other objects and features of the invention will become apparent to those skilled in the art as the disclosure is made in the following description of a preferred embodiment of the invention as illustrated in the accompanying sheet of drawing in which.

Figure 1:
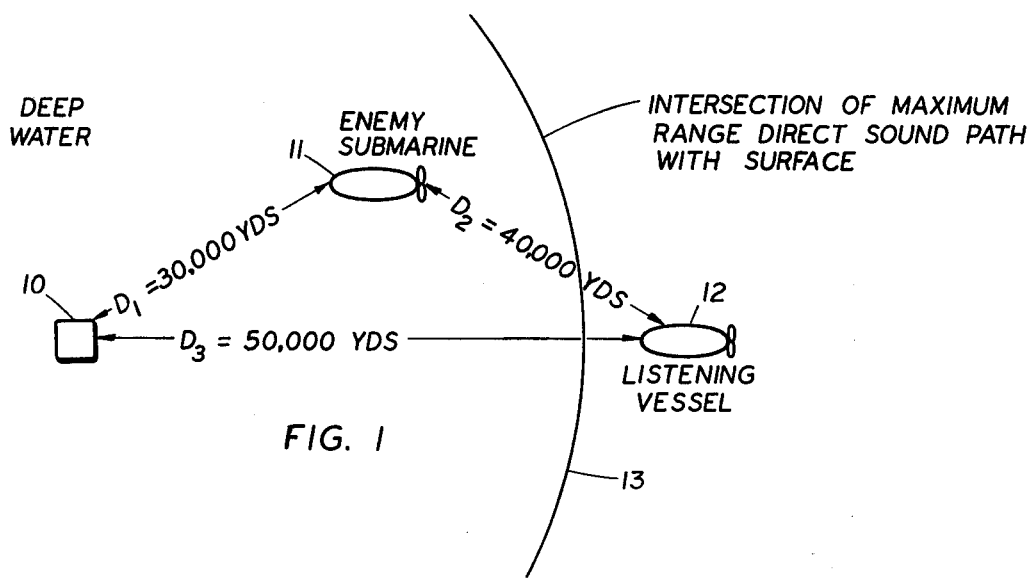
FIG. 1 is a plan view of the relative positions of the sound source and listening vessel with respect to the body of water to be patrolled.

In planning a system to utilize a separate bottom-mounted sound source or sources and in determining the properties and effectiveness of the system, four principle uncertainties arise. First, the target echo strength is relatively unknown for the bistatic configuration (sound source and detector at different locations). Based on available experimental data, an average echo strength of 15 db is assumed. It is not expected that the deviation of the actual echo strength from the assumed figure will be very great. The effect of such a deviation would be essentially to change the range or the sound source level required for operation of the present method.

A second uncertainty arising operation of the present method is in the quality and nature of the reverberation to be expected from this bistatic configuration. In particular, the surface scattering from a deep sound source is relatively unknown. However, using a signal of broad frequency characteristics, a known type of correlation system will be capable of discriminating against the surface reverberation. The sea surface changes with time and the part of the echo which is due to surface roughness will vary in an uncorrelated way. Using correlation techniques employing passive sonar geometry, multi-path transmissions may be separated from the direct echo signal.

A third area of uncertainty is the degree of correlation to be expected from the direct signal arriving from the sound source and the same signal reflected from the target submarine. Because the target is, in fact, an extended object, it is expected that this correlation is somewhat less than perfect.

The last source of uncertainty and possible error in echo detection is the horizontal deflection of sound rays by thermal gradients. This is an element of uncertainty which is common to all long range sonar systems.

The acoustic parameters which effect the operation of the present method are: (1) source level, $S_N$ (expressed in db referred to 1 microbar at 1 yard); (2) propagation loss from sound source to target and from target to own submarine; (3) target strength of the enemy submarine; (4) signal processing gain; (5) background noise, such as ambient wave noise, reverberations, and self-noise of the listening vessel. From a knowledge of these factors one can determine the maximum range at which an enemy submarine can be detected using the present method.

The first and last two of these parameters ($S_N$ and background noise) are essentially the same as in other sonar systems and hence no further discussion of them is deemed necessary. However, the three remaining parameters differ somewhat from those used in conventional sonar systems and require some discussion. The propagation loss, for example, consists of two parts, the attenuation (caused by spreading and absorption) from the sound source to the target and the further attenuation of the sound reflected from the target to the receiving hydrophone at the listening submarine. In conventional sonars these two paths are the same since the sound source and receiver are usually the same transducer. Here the transmitting and receiving transducers are different; they will usually be widely separated horizontally, and also will be at different depths.

Figure 2:
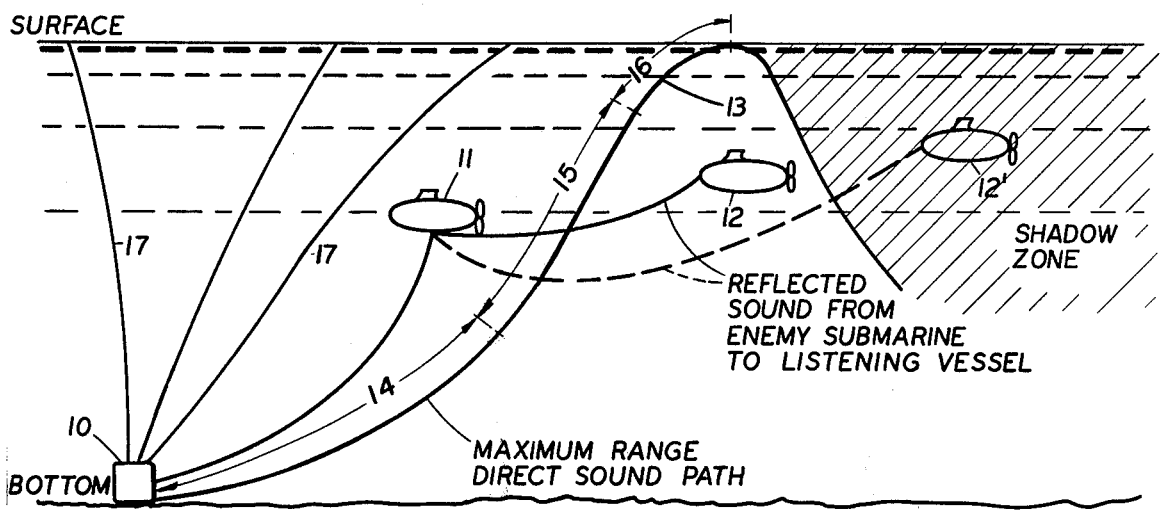
FIG. 2 is an elevational view showing the position assumed by the listening vessel with respect to a bottom-mounted sound source and the enemy submarine whose presence is to be detected.

Referring to FIGS. 1 and 2, of the drawing a bottom-mounted sound source 10 is positioned within the center of a body of water 13 which is to be patrolled by submarine 12. Depending on the size of the body of water 13 and the distance from the sound source 10 to the listening vessel 12, the required output level of sound source 10 can be calculated. The sound paths 17 which are represented by a family of curves in FIG. 2 emanate from the source 10 to the surface of the water substantially as shown due to the propagation characteristics of the water. The velocity of sound in water will increase with either an increase in temperature or an increase in pressure of the water. It can be seen in FIG. 2 that in region 15 the sound path would pass through a region of minimum velocity. The sound will travel faster in regions 14 and 16. In some ocean areas, particularly in and near the polar regions, the surface water will not be warm and region 16 will be absent. The decrease in the sound velocity in passing from a region 14 of high pressure to region 15 of a lower pressure will cause the sound wave length to be shortened and thus cause the sound wave path to bend upward as it enters region 15. Upon reaching region 16 the increased temperature will cause the sound velocity to increase, thus increasing the wavelength and causing the sound wave path to bend downward again as it reaches the surface. The horizontal distance from sound source 10 to a point on the ocean floor directly below point 13 is equivalent to one quarter of a cycle for the sound waves traveling in the maximum range direct sound path.

It should be noted that due to the curvature of the sound rays emitted from sound source 10, there exists a shadow zone just beyond the intersection of the maximum range direct sound path with the surface of the water. This zone will be poorly illuminated because of the refraction phenomenon as shown in FIG. 2, and the listening submarine may assume a position therein thereby maintaining a capacity to detect sound echos reflected from the enemy submarine while remaining undetectable. The horizontal distance from the sound source to this zone is typically in the order of 17 miles in deep water and any sound rays from the sound source reaching the listening vessel and reflected therefrom would be negligible.

Figure 3:
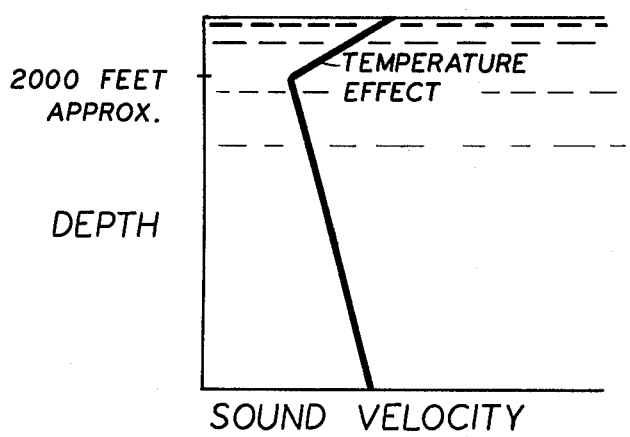
FIG. 3 is a graph of sound velocity versus water depth.

The graph of FIG. 3 illustrates a typical sound wave velocity versus depth characteristic in a part of the world where the temperature near the surface of the water is warmer than at greater ocean depths. This sound velocity will, beginning at the depth of the sound source, begin to decrease with a decrease in pressure until a depth of about 2,000 feet is reached. At this point there is an increase in sound velocity due to the temperature effect as explained above. FIG. 3 is characteristic of only certain ocean areas and for some polar areas such a graph would not reveal a change in sound velocity due to the surface temperature effect.

The radius of coverage, i.e. the horizontal distance from sound source 10 to a point on the ocean floor directly below point 13, will also vary with the depth of the sound source. For example, in 100 fathom water, the radius of primary coverage reaches about 6,000 yards, whereas in water 500 fathoms deep the primary coverage for a given sound source may be taken as approximately 15,000 yards.

For the purposes of a discussion of the performance of the above-described method, it will be assumed that the horizontal distance from the sound source 10 to a point directly below point 13 is approximately 17 miles and that the triangular distances between sound source 10, enemy submarine 11 and listening submarine 12 and 12' are substantially as shown in FIG. 1. Assuming that surface reverberations will not be troublesome, the required sound source signal strength for various assumed positions of 10, 11 and 12 in FIG. 1 necessary to provide useful information at the listening vessel 12 or 12' can be determined. In systems under design the sound emitted has some of the characteristics of white noise in that its frequency components cover one or two octaves and it has a duration of several seconds for each pulse. The noise has a center frequency of approximately 2KC. This long time duration and wide frequency spread permits certain correlation techniques to be used to discriminate against surface reflections and instabilities of multi-path transmission. This noise like characteristic of the signal is deemed to be advantageous although not essential.

To determine the required source level at 10, we observe that sound source ($S_o$) level minus the propagation loss L plus the target strength T, hydrophone array directivity at the listening vessel H, and signal processing gain P should at least equal the background noise level at the receiving hydrophone.

$$S_O - L + T + H + P = B \qquad \text{Eq.(1)}$$

$S_O$ = source level of sound source 10 relative to 1 microbar at 1 yard.

Equation (1) can be used to determine the required level of the sound source. This equation of course applies to the path of sound travel from the source 10 to the submarine 11 and via the reflected path from submarine 11 to the listening vessel 12. The term L can be sub-divided into:

$L_1$ = propagation loss from sound source 10 to target 11, and $L_2$ = propagation loss from target boat to listening vessel.

Target strength measurements have been made on a scale model submarine for all bistatic angles and the beam average thereof was found to be +21 db; for quarters the average is +9 db. Even though the geometry is somewhat different in the present situation, it is believed that a reasonable and safe average for the bistatic target strength of a submarine is 15 db for all aspects and all bistatic angles. The sum of the hydrophone array directivity H and the processing gain P are in the order of 20 db. The background noise level for sea state 2 and an octave band at 1 KC is in the order of −9 db. The latter three parameters however become relatively insignificant at this point since it is desired to determine the ratio of the sound level of the signal reflected from the listening vessel to the enemy submarine, to the sound level of the echo reflected from the enemy submarine to the listening vessel. It will be assumed that the factors H, P and B are substantially the same for both the enemy submarine and the listening vessel in performance of the above method.

In order to determine the above ratio, the following calculations are made for the exemplary embodiment of FIG. 1, assuming the listening submarine to be at position 12:

I. Loss in sound intensity over path from sound source to enemy submarine (target):

1. Spherical spreading to 10,000 yds. = $20 \log_{10} \frac{10,000}{1}$ = 80 db
2. Cylindrical spreading from 10,000 to 30,000 yds = $10 \log_{10} \frac{30,000}{10,000}$ = 4.8 db
3. Attenuation loss based on factor of .047 db/kyd for 30,000 yds = .47 db/Kyd × 30 Kyd = 1.4db
   Total = 86.2db Target strength = 15 db II. Loss in sound intensity over path from enemy submarine (target) to listening vessel (own boat):

1. Spherical spreading to 10,000 yds = $20 \log_{10} \frac{10,000}{1}$ = 80 db
2. Cylindrical spreading from 10,000 to 40,000 yds = $10 \log_{10} \frac{40,000}{10,000}$ = 6 db
3. Attenuation loss based on loss factor of .047 db/Kyd for 40,000 yds = (.047 db/Kyd) (40 Kyd) = 1.9db
   Total = 87.9db Therefore the difference between transmitted and received sound intensity is equal to 87.9 db + 86.2 db − 15 db = 159.1 db III. Loss in sound intensity over path from sound source to listening vessel (own boat):

1. Spherical spreading to 10,000 yds = $20 \log_{10} \frac{10,000}{1}$ = 80db
2. Cylindrical spreading from 10,000 to 50,000 yds = $10 \log_{10} \frac{10,000}{1}$ = 7 db
3. Loss due to surface reflection = 5 db (assuming listening vessel is relatively near the surface)
4. Attenuation loss based on loss factor of .047 db/Kyd for 50,000 yds = (.047 db/Kyd) (50 Kyd) = 2.4 db
   Listening vessel target strength = 15 db Total = 94.4 db IV. Loss in sound intensity over path from listening vessel to enemy submarine:

1. Spherical spreading to 10,000 yds = $20 \log_{10} \frac{10,000}{1}$ = 80 db
2. Cylindrical spreading from 10,000 to 40,000 yds = $10 \log_{10} \frac{40,000}{10,000}$ = 6 db
3. Attenuation loss based on loss factor of .047 db/Kyds for 40,000 yds = (.047 db/Kyd) (40 Kyd) = 1.9 db
   Total = 87.9 db Adding III and Iv = 94.4 db + 87.9 db − 15 db (gain at listening vessel) = 167.3 db.

Therefore subtracting 159.1 db from 167.3 db gives a difference of 8.2 db which is the db difference in the power levels between the echo from the enemy submarine at the listening vessel, and the listening vessel echo at the enemy submarine. This 8.2 db difference is calculated for a ping or pulse emanating from the sound source 10. For a continuous wave the listening vessel's advantage would be substantially greater due to the higher background noise at the target vessel arising from its closer proximity to the sound source.

The preceding numerical considerations relate to the configuration in which the listening submarine (own boat) is in the relatively unfavorable position indicated by 12 in FIG. 3. If it is in position 12' its detection advantage over the enemy submarine will be even greater since there will be no direct sound path between the source and the listening submarine. The listening submarine sound illumination will be only due to sound scattering in the water, and will be very low.

Although a number of different types of sound sources are feasible for short-term operation of the above method, the performance requirements that there be complete unmanned operation for a period of at least 2 years and an acoustical output of 133 db at one meter in an octave band centered at 1 kc with roughly a one percent duty cycle have indicated the desirability of using nuclear powered sound sources. The nuclear powered sound source requires conversion of the reactor energy to acoustical energy of a type which can be used in this present system. Conventional sources such as electromechanical transducers or mechanical noise makers may not be desirable because of the size required for them to obtain the desired high acoustical output.

Two systems which are feasible are (1) the pulsing of high pressure steam and (2) exploding a mixture of hydrogen and oxygen obtained by electrolysis of the sea water.

Obviously many modifications and variations of the present invention are possible in the light of the above teachings. For example, it is possible that the sound sources could be mounted on nuclear powered mobile platforms under acoustic, wire or radio control from the searching vessel. An additional possibility in that of towing of the sound sources behind the searching vessel. If sufficient length of tow line is used, missiles directed against the sound source might be sufficiently far from the towing vessel to be harmless.

Various types of additional sound sources which meet the desired output level requirements may also be employed with the novel method described herein without departing from the spirit and scope of the invention. It is therefore to be understood that within the scope of the appended claims, the invention may be practiced otherwise than as specifically described.

I claim:

1. The method of detecting the presence of an enemy submarine within a given body of water without revealing the position of a listening vessel outside said body of water to said enemy submarine which comprises the steps of:

submerging a self-contained sound source on the floor of the ocean on the central vertical axis of said body of water, said sound source having a sufficient power output to enable sound waves to be transmitted to an enemy submarine within said body of water and be reflected therefrom to points outside said body of water, propagating a high intensity, nondirectional sound signal from said sound source within said body of water, positioning a listening vessel a predetermined distance outside said body of water, said predetermined distance being that required for said listening vessel to detect an echo of a sound signal originating at said sound source and reflected from said enemy submarine, while the sound from the source reflected from said listening vessel into said body of water will be of too low a level to be detected at said enemy submarine within said body of water, and detecting an echo of a sound signal originating at said sound source and reflected from said enemy submarine at said listening vessel.

2. The combination of claim 1 wherein the distance between the listening vessel and said sound source is such that the sound wave propagational losses in the path of travel of a signal from said sound source to said enemy submarine reflected therefrom to said listening vessel are insufficient to render said reflected signal level at said listening vessel lower than the background noise at said listening vessel, said sound wave propagational losses in the path of travel of a signal from said sound source to said listening vessel and reflected therefrom to said enemy submarine being sufficient to render the reflected signal level at said enemy submarine lower than the level of background noise at said enemy submarine.

3. The method of claim 1 wherein said predetermined distance is that measured from said sound source to a point just beyond the intersection of the maximum range direct sound path of sound waves from said source with the surface of the water.

4. The method of claim 2 wherein said sound source is nuclear powered.

5. A method of detecting an underwater sound signal reflected by a target submarine without revealing the position of the listening vessel comprising the steps of:

submerging a plurality of sound sources in a body of water to be patrolled, propagating a nondirectional sound signal from each of said plurality of sound sources within said body of water, positioning a listening vessel at a predetermined distance from said plurality of sound sources so that the propagational loss in water for sound waves which are transmitted from said plurality of sound sources to the target submarine within said body of water and reflected therefrom to said listening vessel is substantially less than the propagational loss for a sound wave transmitted from said source to said listening vessel and reflected therefrom into said body of water, and detecting an echo of a sound signal originating at one of said plurality of sound sources and reflected from said enemy submarine at said listening vessel.

6. The method of claim 5 wherein said sound source is nuclear powered.

* * * * *